Oct. 30, 1962      R. T. WALLACE      3,061,475
METHOD OF PRODUCING PACKAGING MATERIAL
Filed May 20, 1957
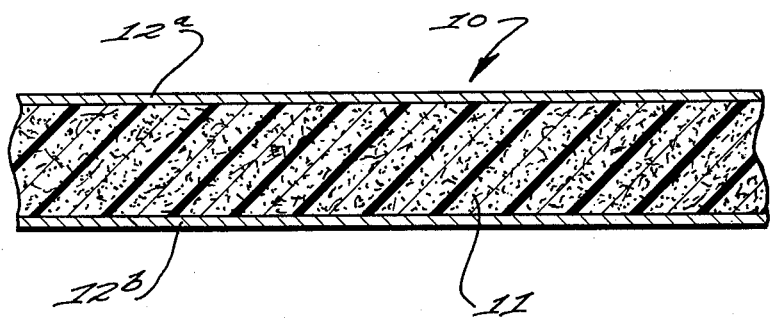
INVENTOR
Robert T. Wallace
BY W. A. Schaich &
Leonard D. Souber
ATTORNEYS

United States Patent Office 3,061,475
Patented Oct. 30, 1962

1

3,061,475
METHOD OF PRODUCING PACKAGING MATERIAL
Robert T. Wallace, Toledo, Ohio, assignor to Owens-Illinois Glass Company, a corporation of Ohio
Filed May 20, 1957, Ser. No. 660,255
6 Claims. (Cl. 117—155)

The present invention relates in general to a method for producing a foam plastic, laminated packaging material and, more particularly, this invention relates to a method for producing a foam plastic laminated, cellulose material such as kraft paper, paperboard, or the like.

It is well known in the paper-making industry that packaging materials such as cardboard, corrugated board, and the like, commonly employed in the fabrication of shipping cartons, carton liners, and other similar paper and paperboard items, undergo an appreciable loss of strength when exposed to high moisture or high humidity conditions. Quite frequently, when such items are utilized to ship fragile or perishable commodities, they become exposed or subjected to adverse weather conditions, and tend to degenerate to such an extent that the commodities packaged therein do not receive adequate protection. Hence, considerable developmental work has been conducted in the past with a principal aim being to provide a packaging material which might readily serve as a substitute for conventional paper carton materials and corrugated paperboard, or the like, which exhibits improved physical characteristics, particularly with respect to wet strength and moisture and impact resistance. Obviously, however, the low cost, competitive nature of conventional paperboard and corrugated paperboard packaging materials requires that such an improved substitute material be capable of being produced at a cost generally competitive and commensurate with the conventional materials heretofore employed.

In the search for such an improved packaging material, it has been previously found that expanded or cellular plastic materials, such as foamed polystyrene or derivatives thereof, may be employed as an interlayer between sheets of ordinary kraft paper, or the like, to form a packaging material having improved moisture resistance and wet strength. However, foamed polystyrene materials and the like which have heretofore been utilized are not capable of inherently or chemically bonding directly to the paper sheets. Consequently, it has been common practice to provide an intermediate adhesive material or bonding agent with which to effect an adherence between the sheets of paper and the foamed polystyrene interlayer. Naturally, the additional cost attributable to the use of such adhesives or bonding agents or mediums presents an added manufacturing cost which from a competitive standpoint it is desirable to eliminate. Furthermore, since the bonding achieved by such adhesives or bonding agents is a mechanical bond, the adhesion so obtained is frequently disrupted when the laminated material is exposed to a moist environment or ambient high humidity conditions and permits the foamed polystyrene and paper to separate.

Furthermore, such foamed polystyrene interlayers are prepared, generally, by pre-foaming the polystyrene under the influence of elevated temperatures and shaping the foam into a thin sheet or slab which, after sufficient setting, is laminated with the paper through the use of intermediate adhesives or bonding agents as previously described. An alternate method of forming such laminates comprises placing an unfoamed polystyrene material, together with a suitable gas-forming agent, between sheets of paper and then subsequently foaming the polystyrene by activating the gas-forming agent under the influence of elevated temperatures. In either event, however, the degree of foaming obtained and, hence, the density of the laminated material is regulated principally by the temperature employed and the length of time the material is subjected to such temperature or temperatures. Thus, the time-temperature control is a critical factor in the processing of such material and must be accurately controlled.

Additionally, it is well known that foamed polystyrene materials are characteristically brittle and friable in nature. Consequently, the foamed structure is quite susceptible to being crushed or dented when subjected to the type of treatment frequently occasioned in the shipment and handling of cartons and similar shipping containers. As a result, cartons constructed from foamed polystyrene laminated packaging materials, when crushed or dented, have a tendency to dust, which further results in an objectionable coating of such dust covering the contents of the carton and causing contamination thereof.

It will be evident from the foregoing that the provision of a packaging material such as paper, paperboard, corrugated board, or the like, having a foamed plastic interlayer, presents a packaging material having improved chracteristics, particularly with respect to wet strength and moisture resistance. However, it is equally evident that a foamed plastic interlayer having improved characteristics with respect to: elimination of additional adhesives or bonding agents, a greater impact resistance, less tendency to dust, and direct control of foam density without reliance upon accurate time-temperature control, is highly desirable.

Accordingly, it is an object of this invention to provide a method for producing a foamed plastic laminated paper, paperboard, or the like which is characterized by such desirable features described above.

Another object of this invention is to provide a method for producing an improved packaging material comprising a cellular plastic interlayer which is chemically bonded directly to superimposed layers of paper and possessing improved characteristics with respect to wet strength, moisture resistance, impact resistance, and mechanical shock absorption.

A further object of this invention is to produce a packaging material suitable for utilization as an improved substitute for conventional paperboard, corrugated board, and other like materials utilized in the production of various types of shipping containers, cartons, and the like.

A particular object of this invention is to provide a method for producing an improved packaging material having the above described characteristics and which comprises a foamed plastic interlayer which is capable of chemically bonding directly with the cellulose fibers in the paper without necessitating the provision of additional adhesives or bonding agents.

The specific nature of this invention, as well as other objects and advantages thereof, will become apparent to those skilled in the art from the following detailed description, taken in conjunction with the annexed drawing on which, by way of example only, are illustrated the preferred embodiments of this invention.

For a better understanding of this invention, reference may be had to the accompanying drawing on which there is represented a cross-sectional view of an improved packaging material fabricated in accordance with this invention.

On the drawing, there is illustrated a laminated packaging material 10, such as may be produced according to the method of this invention and such as is suitable for fabrication in light-weight cartons, carton liners, partitions, and other like items. It will be observed that the packaging material 10 is generally characteristic of conventional packaging materials such as cardboard, corrugated paperboard, and the like, with the principal exception that the core 11 of the material comprises a foamed plastic material having a fine, cellular structure composed of homogeneously dispersed voids or cells. Superimposed on the core 11 are sheets or layers of paper 12a and 12b, which are preferably in an uncoated or unglazed condition on the surface to which the foam is to be applied, and which have constituent cellulose fibers or other cellulosic materials in the composition thereof. By virtue of an interreaction between the foam plastic material and the cellulosic constituents of the paper, the paper facings are chemically bonded directly to the foam plastic core, without the use of additional adhesives or bonding agents being required. The manner in which this chemical bonding occurs will be subsequently described in greater detail.

The foamed plastic core 11 is preferably a foamed polyurethane composition which may be formed by foaming a liquid mixture of a foamable polyurethane-type prepolymer, a tertiary amine, and water, directly in contact with the paper facings 12a and 12b. Alternatively, the liquid mixture may comprise an aromatic diisocyanate, preferably toluene 2,4-diisocyanate, a polyol or polyester resin or a polyether, a tertiary amine such as N-methyl morpholine, tripropylamine, or the like, and water. Convenient commercial preparations of such liquid mixtures are also quite suitable for this purpose. One such commercial preparation which has been found to be suitable is a ready-to-mix prepolymer and catalyst preparation marketed under the trade-mark "Isofoam," which is available from Isocyanate Products, Inc., Wilmington, Delaware.

In preparing a packaging material such as that illustrated, according to the present invention, a polyurethane prepolymer, catalyst, and water are thoroughly mixed together, and partially reacted and foamed prior to application thereof onto the paper facings. When the procedure is carried out in this manner, the foam will be partially, but not completely, expanded when it is applied to the paper facings. After the foamed plastic mixture has been so applied, the reaction is permitted to proceed substantially to completion while in situ. Although the liquid admixture may be applied directly to the paper facings prior to the initial foaming, it has been found that frequently an appreciable amount of the liquid is absorbed by the paper facings and, consequently, the reaction between the constituents in the liquid admixture frequently does not proceed to the extent of completion desired, and does not result in the fine homogeneous cellular structure obtained when the polyurethane is permitted to partially foam prior to application onto the paper facings.

The reaction between the admixed constituents of the polyurethane prepolymer, catalyst, and water mixture may be carried out in relatively simple manner without the necessity of subjecting the mixture to elevated temperatures or pressures as is usually the case in forming foamed polystyrene materials. For example, when the polyurethane prepolymer, catalyst, and water are admixed at room temperature, or about 85° F., the polyurethane prepolymer undergoes an exothermic condensation-polymerization reaction and liberates carbon dioxide gas which is entrapped within the liquid mixture in the form of tiny globules or gas pockets. The expansion of the mixture resulting from these gas pockets causes the liquid mixture to take on the characteristics of a foamy structure comprising a myriad of disconnected cells homogeneously dispersed throughout the mixture. After the initial foaming action has commenced, but before completion thereof, the liquid mixture, in its partially expanded condition, is coated onto the paper facings 12a and 12b in a smooth and uniform manner to form a laminated or sandwich-type structure in which the partially expanded mixture forms an interlayer between the paper facings. The procedure followed in coating the paper facings may consist of spreading the partially foamed liquid mixture on one facing only, as for example facing 12a, and then bringing the other facing 12b into contact with the foam or, alternatively, consists of spreading the partially foamed liquid mixture on both facings 12a and 12b before laminating them together. In either event however, the integration must be carried out before the polymerization of the liquid mixture is completed, in order to insure the desired chemical bonding between the facings and the foam. This coating operation may be carried out mechanically by suitable spraying or roller coating apparatus. Likewise, a doctor blade may be employed in conventional manner to control and maintain the thickness of the foam layer applied. Optionally, the coating procedure may be carried out in the form of a hand operation wherein the partially expanded foam may be applied with a spatula or other such instrument capable of applying the foam and evenly distributing it on the surface of the paper facings. During and after the application of the partially expanded foam, the reaction will continue uninterrupted until completion. Simultaneously with the foaming action, the mixture will polymerize by virtue of the condensation-polymerization reaction taking place, the nature of which is well known in the art.

As indicated previously, the facings 12a and 12b are preferably uncoated or unglazed in order to facilitate a direct inter-reaction between the constituent cellulose fibers in the paper and the foaming polyurethane liquid. In this manner, the cellulosic constituents in the paper are permitted to come into direct and intimate contact with the polyurethane foam during the condensation-polymerization reaction so that the hydroxyl ($OH^-$) end groups of the cellulose formation are permitted to react with the polymerizing polyurethane, and thereby chemically bond the polyurethane directly to the paper facings to form an integrated packaging material having greatly improved properties.

Packaging materials constructed according to the principles set forth in the present invention have been found to possess highly improved properties when compared with conventional cardboard and corrugated paperboard products or polystyrene laminated paperboard products. A laminated polyurethane foam plastic packaging material, such as is described herein, incorporates substantially all of the desirable features of ordinary cardboard, corrugated paperboard, and in addition, exhibits greatly improved characteristics of moisture resistance, wet strength, impact resistance, and cushioning effect.

A further advantage resides in the direct chemical bonding achieved between the cellulosic constituents of the paper which permits the foam core and paper facing material to combine to form an integrated laminar structure without the use of additional adhesives, and which thereby tends to reduce manufacturing costs and, at the same time, form a strongly adherent non-mechanical bond. The degree of foaming and, hence, density of the plastic core can be readily regulated by proportioning the constituents of the initial liquid mixture without necessitating the use of elevated temperatures and accurate control thereof. Also, as is well known in the art, the impact resistance and rigidity of foamed polyurethane materials can be varied by chemical composition and can range from a rigid material through various degrees to a very flexible structure. In its application as an interlayer for forming a packaging material in the manner previously described, a semi-rigid foam structure having a density in the range of approximately 2–25 p.c.f. is deemed preferable in most instances, since such a structure is capable of providing a high degree of cushioning effect and impact resistance wthout crushing or denting of the foam or cellular structure. Also, the flexibility of the structure tends to eliminate the objectionable dusting tendencies of brittle and friable foam plastic materials, such as foamed polystyrenes, for example.

Another advantage obtained through utilization of polyurethane foams is the adaptability of the foam material to simple applicating procedures such as, for example, conventional spray or roller coating procedures, or even by manual application.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. A process for producing a foam plastic and paper lamination comprising the steps of partially reacting a liquid mixture of cellular plastic forming materials, said liquid mixture including an aromatic diisocyanate, a polyol, catalyst, and water, coating a sheet of paper with said mixture while the latter is in a partially reacted and partially foamed condition, whereby said reaction continues while said mixture remains in contact with said paper and chemically bonds said cellular plastic thereto.

2. In a process for producing a foamed polyurethane plastic, formed from an aromatic diisocyanate and a material selected from the group consisting of a polyether and a polyester in the presence of water, and cellulosic paper lamination wherein the polyurethane is chemically bonded to the paper during its formation while in contact with the paper by reaction of the polyurethane with OH groups in the paper, the improvement which comprises partially reacting and partially foaming the polyurethane prior to contacting the paper therewith, the partially-foamed polyurethane containing a catalyst and water when it is contacted with the paper, and thereafter contacting the paper therewith and allowing the polymerization reaction and foaming to continue to completion.

3. A process according to claim 2 wherein said selected material is a polyether.

4. A process of claim 2 wherein said selected material is a polyester.

5. A process of claim 2 wherein said foamed polyurethane is formed by reaction of a polyester resin, toluene 2,4-diisocyanate, a tertiary amine catalyst and water.

6. A process of claim 2 wherein said foamed polyurethane is formed by reaction of a polyether, toluene 2,4-diisocyanate, a tertiary amine catalyst and water.

References Cited in the file of this patent

UNITED STATES PATENTS

| | | |
|---|---|---|
| Re. 24,514 | Hoppe et al. | Aug. 12, 1958 |
| 2,770,406 | Lane | Nov. 13, 1956 |
| 2,787,601 | Detrick et al. | Apr. 2, 1957 |
| 2,841,205 | Bird | July 1, 1958 |
| 2,841,515 | Runton | July 1, 1958 |
| 2,872,965 | Sisson | Feb. 10, 1959 |
| 2,948,651 | Waag | Aug. 9, 1960 |

FOREIGN PATENTS

| | | |
|---|---|---|
| 723,621 | Great Britain | Feb. 9, 1955 |
| 842,267 | Germany | Sept. 15, 1952 |